United States Patent [19]

Ino et al.

[11] Patent Number: 4,786,012
[45] Date of Patent: Nov. 22, 1988

[54] MINIATURE TYPE TAPE CASSETTE

[75] Inventors: Masahiko Ino; Hitoshi Takahashi, both of Mito; Hiromichi Hirayama, Yokosuka, all of Japan

[73] Assignee: Victor Company of Japan, Ltd., Yokohama, Japan

[21] Appl. No.: 76,709

[22] Filed: Jul. 23, 1987

[30] Foreign Application Priority Data

Jul. 26, 1986 [JP] Japan .............................. 61-175983
Jul. 26, 1986 [JP] Japan .............................. 61-175985

[51] Int. Cl.$^4$ .......................................... G11B 23/087
[52] U.S. Cl. .................................................. 242/198
[58] Field of Search .............................. 242/197–200; 360/132; 206/387; 220/334

[56] References Cited

U.S. PATENT DOCUMENTS 4,485,988 12/1984 Kikuya et al. ................. 360/132 X
4,485,989 12/1984 Ogiro et al. ......................... 242/198
4,556,153 12/1985 Takagi et al. ................... 360/132 X
4,628,389 12/1986 Tanaka et al. ...................... 360/132

Primary Examiner—David Werner
Attorney, Agent, or Firm—Michael N. Meller

[57] ABSTRACT

A miniature type tape cassette comprises a spring for urging a lid having a first hook in a lid closed direction and a lid locking member like an elastic plate having a projecting part, a second hook and a rear part. The projecting part projects from a side wall of a cassette case through a through window formed in the side wall. The second hook engages with the first hook when the lid is in a closed state. The rear part is fitted into a supporting part of the side wall in the tape cassette, so that the lid locking member is fixed to the side wall of the cassette case. The release of lock of the lid is carried out by pressing the projecting part of the lid locking member.

11 Claims, 8 Drawing Sheets

MINIATURE TYPE TAPE CASSETTE

BACKGROUND OF THE INVENTION

The present invention relates to tape cassettes for recording and/or reproducing apparatuses such as a video tape recorder (VTR), and in particular to miniature type tape cassettes which are smaller than standard type tape cassettes and the miniature tape cassettes are used together with a tape cassette adapter for standard type recording and/or reproducing apparatuses primarily designed for standard type tape cassettes. The present invention more particularly relates to miniature type tape cassettes into which there is built a lid locking mechanism for locking a lid which closes to protect a tape extending along the front of a cassette case.

As well known, tape cassettes of a standard type size are generally used in recording and/or reproducing apparatuses such as a video tape recorder (VTR). It is also well known that miniature type tape cassettes were recently developed which have the interchangeability with respect to apparatuses primarily designed for standard type tape cassettes and can be recorded and/or reproduced thereby.

This kind of miniature type tape cassettes can be recorded and/or reproduced not only by recording and/or reproducing apparatuses designed exclusively for the miniature type tape cassette, but also by a recording and/or reproducing apparatus primarily designed for the standard type tape cassette by being accommodated within a tape cassette adapter which is substantially the same size as standard type tape cassettes.

Also, the miniature type tape cassette is generally provided with a lid which closes to protect a magnetic tape extending along the front of a cassette case when the tape cassette is not used, and opens to a position not to interfere with the drawing of the tape out from the cassette case before the tape cassette is operated, wherein the lid is constructed to be maintained at either the closed state or the open state. Such a lid provided in the miniature type tape cassette is disclosed in the U.S. Pat. No. 4,494,161, for example, in which the assignee is the same as that of the present application.

However, conventional miniature type tape cassettes themselves do not have a lid locking mechanism for positively locking the lid which is intended to prevent the lid manually opened when the tape cassette is not loaded into a recording and/or reproducing apparatus designed exclusively for the miniature type tape cassette tape or into the tape cassette adapter. Therefore, the lid is easily rotated to its completely opened state against the elastic force provided by a leaf spring which urges the lid to fully opened or closed position with a locking motion. As a result, a signal recording surface of the magnetic tape can be exposed and dust or the like is liable to be deposited thereon. This may eventually damage or degrade the magnetic tape accommodated into the tape cassette and may therefore prevent stable recording and/or reproduction.

In order to eliminate the above problems, it is conceivable to provide a positive lid locking mechanism which has already been employed in the standard type tape cassette to the miniature type tape cassette. Such a positive lid locking mechanism includes a member for releasing the lock which is driven by a lock releasing mechanism provided in the recording and/or reproducing apparatuses for the standard type tape cassettes. However, these measures are not practical, as it becomes necessary to modify each of the adapters and the current recording and/or reproducing apparatuses designed exclusively for miniature type tape cassettes already marketed and operated at millions of homes to have corresponding lock releasing mechanism. In other words, it is impossible to adapt the miniature type tape cassette to have lid locking mechanism as described above for the current apparatuses which lacks the corresponding lock releasing mechanism, and to thus maintain the interchangeability. Furthermore, these measures would make the mechanism of the recording and/or reproducing apparatuses or the tape cassette adapters complicated. Of course, this would result in an increase in the total number of components.

SUMMARY OF THE INVENTION

Accordingly, it is a general object of the present invention to provide a novel and useful miniature type tape cassette, in which the above described problems have been eliminated.

Another and more specific object of the present invention is to provide a miniature type tape cassette provided with a lid which closes to protect a tape extending along the front surface side of a cassette case when the tape cassette is not used, and opens to a position not to interfere with the drawing of the tape out from the cassette case when the tape cassette is used, wherein a lid locking mechanism, which prevents the lid from manually opened yet releases the lid to open when loaded into the current recording and/or reproducing apparatuses designed exclusively for a miniature type tape cassette or into current tape cassette adapters which accommodate the miniature type tape cassette therein. According to the present invention, there are provided a first hook formed on a side flange and a spring for maintaining the lid in a closed position, in which one end of the spring engages with the cassette case and the other engages with the lid. Further, there is provided a lid locking member having a projecting part which projects from the side wall of the cassette case and which has a second hook at an end thereof which is located so as to engage with the first hook of the lid, when the lid is in the closed position. The lid locking member further includes a rear part which is located at a position in the vicinity of a cutout part formed in the side wall of the upper half and at a distance from the lid. The rear part of the lid locking mechanism has a fixed part which is inserted into a supporting part formed on the side wall of the upper half.

DETAILED DESCRIPTION

Figure 1:
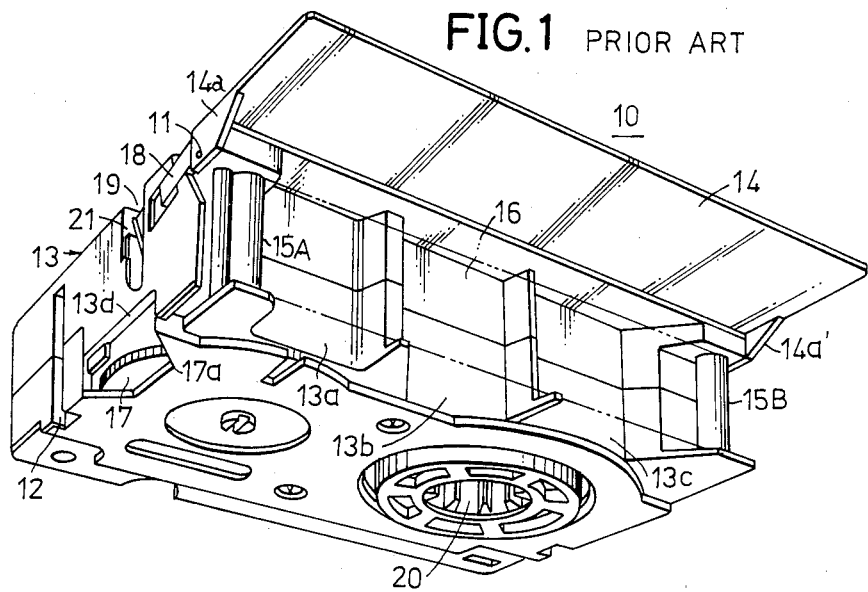
FIG. 1 is a perspective view showing a conventional miniature type tape cassette, viewed from a lower front thereof in a state where a lid of the cassette is open.

A conventional miniature type tape cassette is illustrated in FIG. 1. Referring to this figure, a miniature type tape cassette 10 has a cassette case 13 of a size smaller than a standard type tape cassette which is designed for a standard type recording and/or reproducing apparatus. A lid 14 for protecting a magnetic tape 16 accommodated within the tape cassette 10, is provided on the front of the cassette case 13. The cassette 10 consists of an upper half 13A and a lower half 13B. At a side wall of the upper half 13A, there is formed a cutout 13d through which a gear 17a formed on a peripheral of a take-up reel hub 17 exposes.

Side flanges 14a and 14a' are integrally formed on both ends of lid 14, and respective portions of the flanges are axially supported by corresponding hinge pins 11 (only one shown) in the vicinity of respective corner parts of the upper half 13A, so that the lid 14 is rotatable to open and close. A substantially U-shaped leaf spring 21 which is accommodated within a U-shaped groove 19 formed at the side wall of the cassette case 13 and a slide rod 18 which is urged in the direction toward the hinge pin 11 by the leaf spring 21 is provided in relation to the lid 14. The lid 14 rotates about the hinge pin 11 and can assume two states locking motion. That is, in one state the lid 14 is in a closed state and in another state, the lid 14 is in an open state shown in FIG. 1. When the tape cassette 10 is not loaded into a recording and/or reproducing apparatus designed exclusively for the tape cassette 10 or the tape cassette adapter, the lid 14 covers the front of the cassette case 13 to protect the magnetic tape 16 which is guided by means of guide rollers 15A and 15B provided side by side within the cassette case 13, and which is exposed at the front surface of the cassette case 13.

When using the miniature type tape cassette 10 described above for a recording and/or reproducing apparatus designed exclusively for the miniature type tape cassette shown in FIG. 1, the tape cassette 10 is inserted in to a predetermined position in a cassette holder in the recording and/or reproducing apparatus. Upon inserting the tape cassette, erroneous operations may be prevented due to the action of a groove 12 perpendicularly formed over the side surfaces of the upper and lower halves 13A and 13B. Then, the lid 14 is rotated up to a substantially horizontal position as shown in FIG. 1. Thereafter, the tape cassette 10 is lowered together with the cassette holder. Correspondingly, a supply side reel hub 20 in the cassette case 13 is fitted over a supply reel shaft of the recording and/or reproducing apparatus, and the gear 17a formed at the peripheral of the take-up reel hub 17 meshes with a driving gear of the apparatus. Further, a lid opening mechanism made up of perpendicular and slant loading poles and a capstan in the recording and/or reproducing apparatus enters into recesses 13a, 13b, and 13c at an opening side (front) of the cassette case 13. Under those states, the miniature type tape cassette is maintained within the recording and/or reproducing apparatus designed exclusively for the miniature type tape cassette.

Further, when the miniature type tape cassette is recorded and/or reproduced with the recording and/or reproducing apparatus designed primarily for the standard type tape cassette, the miniature type tape cassette is used in a state where it is loaded into a tape cassette adapter having the same external firm and size as the standard type tape cassette. Such an adapter is disclosed in the U.S. Pat. No. 4,554,603, or the Japanese Utility Model Publication No. 37739/86, in which the assignee is the same as that of the present application.

As discussed in the foregoing, the conventional miniature type tape cassette as shown in FIG. 1 does not include a positive lid locking mechanism for preventing the undesirable manipulation of the lid 14, resulting in the aforementioned problems. In addition, practical solutions for the problems have not yet been proposed before.

The present invention is intended to eliminate the problems as discussed in the foregoing and provide practical solutions.

Description will now be given of a first embodiment of a miniature type tape cassette according to the present invention referring to FIGS. 2 through 11. In these figures, elements indicated with the same numerals as those in FIG. 1 are the same elements as those in FIG. 1.

Figure 2:
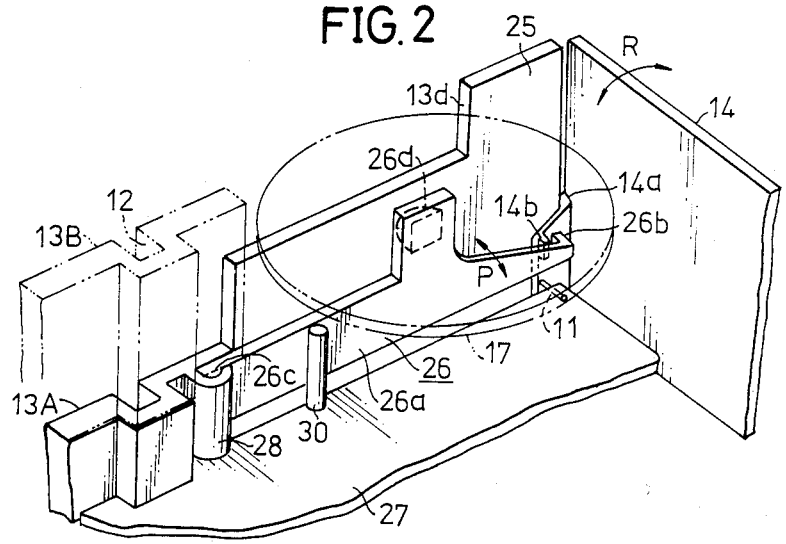
FIG. 2 is a perspective view showing a lid locking mechanism built into a miniature type tape cassette according to the present invention, viewed from a take-up reel hub in the miniature type tape cassette.
Figure 3:
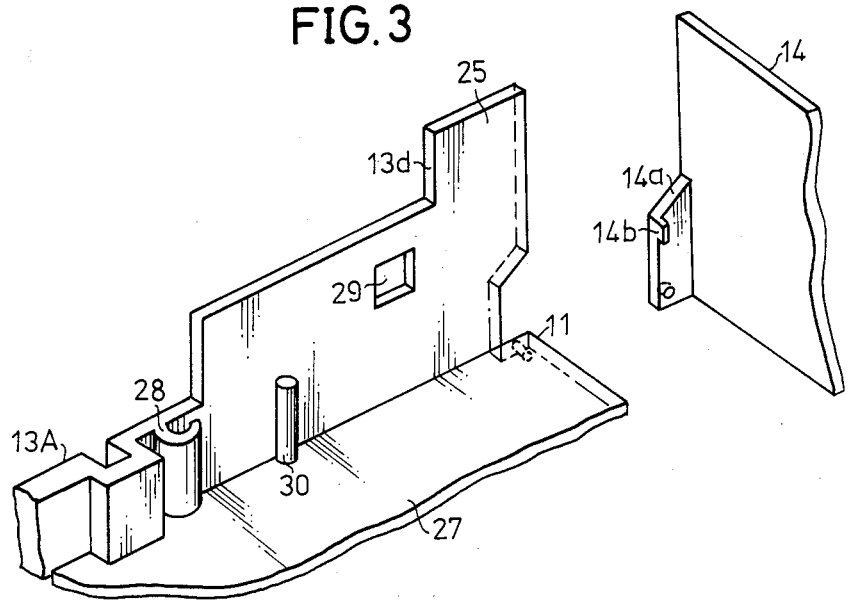
FIG. 3 is a perspective view showing an internal area of the upper half wherein a lid locking member shown in FIG. 2 has been removed.
Figure 4:
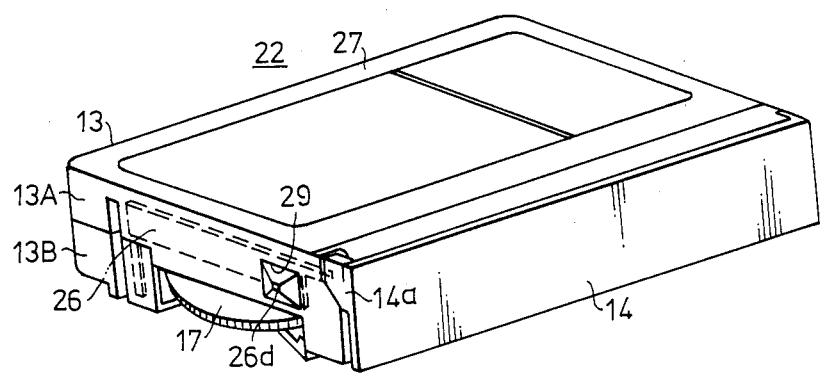
FIG. 4 is a perspective view showing one example of a miniature type tape cassette according to the present invention.
Figure 5A:
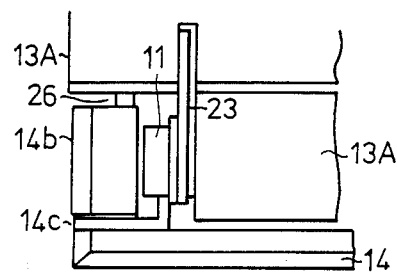
FIGS. 5(A) and 5(B) are plan and perspective views showing a mechanism for axially supporting and urging the lid toward its closed position, respectively.
Figure 5B:
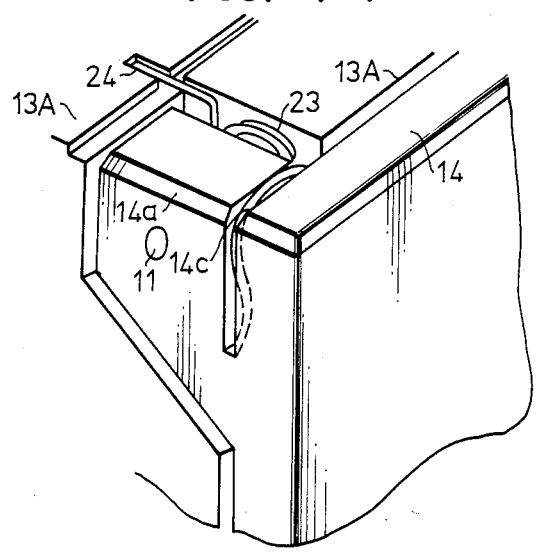

A miniature type tape cassette 22 according to the present invention does not have the mechanism for opening and closing the lid 14 provided in the conventional miniature type tape cassette shown in FIG. 1. That is, the mechanism made up of the slide rod 18, the U-shaped recess 19, and the leaf spring 21 has been removed, as shown in FIGS. 2 through 4. It should be noted that removal of such conventional components for opening and closing the lid 14 never destroy any compatibility with the current recording and/or reproducing apparatuses designed exclusively for the miniature type tape cassettes or tape cassette adapters. Instead, a torsion coil spring 23 shown in FIGS. 5(A) and 5(B) is employed. The torsion coil spring 23 is fitted over the hinge pin 11 at a position in the vicinity of a corner part of the upper half 13A. One of end portions of the torsion coil spring 23 is of substantially S-shaped configuration and is fitted into a groove 14c formed over bottom and side surfaces of the flange part 14a.

The other end portion of the torsion coil spring 23 is substantially straight and is fitted into a groove 24 formed on an outer surface of the upper half 13A. Accordingly, the lid 14 is always urged by the force due to the action of the torsion coil spring 23 toward the lid closed direction.

Description will now be given of a lid locking mechanism according to the first embodiment of the present invention.

As shown in FIGS. 2 and 3, on the side surface flange part 14a which is integrally formed on the lid 14, there is provided a hook 14b which is also integrally formed on the lid 14 and the surface flange part 14a. The hook 14b is formed on an inner surface of the flange part 14a having a trapezoidal cross-section.

Referring to FIGS. 2 and 3, there is provided a lid locking member 26 which interlocks the lid 14 to the upper half 13A when the tape cassette is not loaded into the apparatus or the adapter. The lid locking member 26 having a thin plate shape is arranged in such a manner that one of longitudinal side surfaces of the lid locking member 26 is in contact with an inner side surface 25 of the upper half 13A having the cutout part 13d through which the gear 17a of the take-up reel hub 17 is outwards exposed and that an end face of the lid locking member 26 is in the vicinity of an upper plate 27 of the upper half 13A. The lid locking member 26 is may be unitarily formed of elastic material such as plastic resin by means of injection molding, for instance. As shown in FIG. 2, the lid locking member 26 tapers off toward the lid 14 in order to enhance elasticity of the taper portion. A hook 26b formed at a taper front end of the lid locking member 26 is located so as to engage with the corresponding hook 14b formed on the flange part 14a of the lid 14. Further, the lid locking member 26 has a rear part, which is located in the vicinity of the cutout part 13d formed in the upper half 13A of the cassette case 13, and which remains remote from the lid 14. The rear part of the lid locking member 26 has a fixed part 26c, which is attached to the upper half 13A in a state where the fixed part 26c is tight fitted into a substantially cylindrical supporting part 28 formed on the side surface 25 of the upper half 13A and in the vicinity of the groove 12 for preventing erroneous insertion of the cassette. The relationship between the fixed part 26c of the lid locking member 26 and the supporting part 28 will be described in detail later with reference to FIGS. 8 through 11. Furthermore, the lid locking member 26 is prevented from slipping out at the supporting part 28, because in the assembled tape cassette 22, the lower half 13B partially makes contact with the rear end of the lid locking member 26, as illustrated in FIG. 2.

The hook 26b of the lid locking member 26 engages with the hook 14b of the lid 14 at a position adjacent the hinge pin 11. This arrangement makes it possible to obtain a force enough for the lid 14 to easily ride over the hook 26b of the lid locking member 26 when it returns to the closed state. That is, the lid 14 is urged toward its closing direction due to the action of the torsion coil spring 23. Therefore, it will be understood that under the given torque generated by the tortion coil spring 23 the shorter the length between the hinge pin 11 and the position at which the hook 26b engages with the hook 14b, the greater the force which is exerted at that position.

In the side wall having the cutout part 13d in the upper half 13A, there is provided a through window 29 of a substantially rectangular shape, as shown in FIG. 3.

Figure 6:
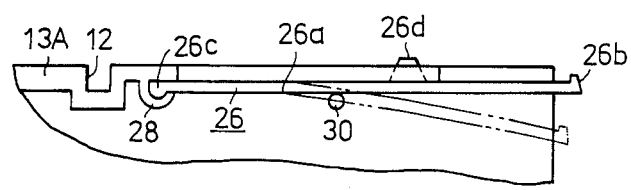
FIGS. 6 and 7 are respectively plan views showing the relationship of the lid locking member and supporting columns for positively straightening the lid locking member.
Figure 7:
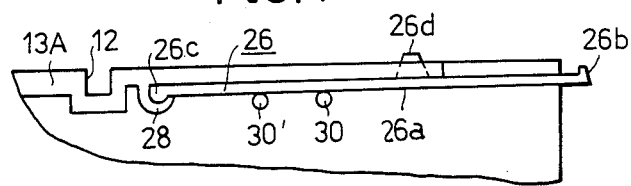

The through window 29 is located in the neighborhood of the lid 14. On a surface of the lid locking member 26 facing the through window 29, there is integrally formed a projection 26d for releasing the interlock of the lid 14. The projection passes through the through window 29 and projects from the side wall of the upper half 13A by a predetermined projecting length, as shown in FIGS. 4, 6 and 7. The projection 26d of the lid locking member 26 has the shape of a truncated rectangular pyramid. That is, the projection 26d has four inclined surfaces which slope downwards to base of the projection 26d. This configuration of the projection 26d enables smooth loading operation of the miniature type tape cassette 22 into the adapter or the apparatus specifically designed for the miniature type tape cassette.

A column 30 which may be unitarily formed on and together with the upper half 13A, perpendicularly projects from the upper plate 27 of the upper half 13A and is in contact with the side surface of the lid locking member 26, as shown in FIGS. 2, 3, 6 and 7. As described in the foregoing, the lid locking member 26 is formed with plastic resin or the like by means of injection molding. Therefore, there is a possibility that molded lid locking member 26 is warped. If this is the case and the column 30 was not employed, the lid locking member 26 would be warped as illustrated with the two-dot chain line in FIG. 6, which would prevent the secure engagement between the hook 14b of the lid 14 and the hook 26b of the lid locking member 26. Since the column 30 is located so that it is in contact with the lid locking member 26, the lid locking member 26 can be held in a state as illustrated with the solid line in FIG. 6. The lid locking member 26 may be supported by means of two columns 30 and 30', as shown in FIG. 7. It is also possible to use members with a triangle or rectangular cross-section instead of the round column.

Figure 8:
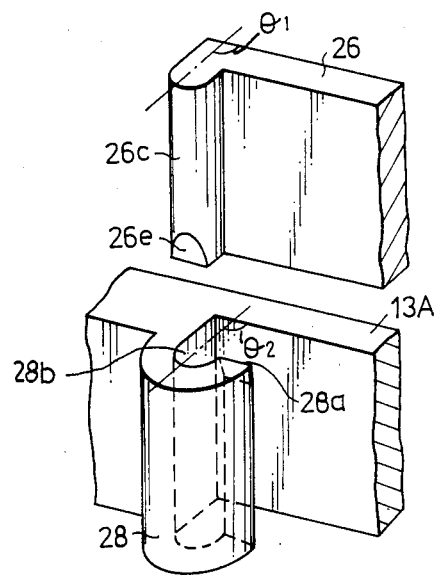
FIGS. 8 and 9 are disassembled and assembled perspective views respectively of a rear part of the lid locking member and a corresponding part of an upper half of a tape cassette.
Figure 9:
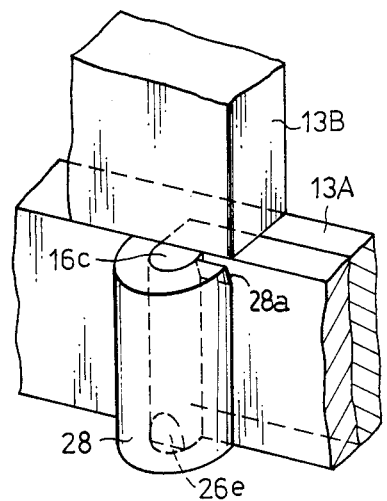

The relationship between the fixed part 26c of the lid locking member 26 and the supporting part 28 in which the fixed part 26c is fitted, is as shown in FIGS. 8 and 9. The fixed part 26c having a curved peripheral surface projects from the body of the lid locking member 26 in the direction defined by the center angle $\theta_1$ with respect to the inner surface of the lid locking member 26. On the other hand, the supporting part 28 which accommodates the fixed part 26c has a substantially J-shaped cross-section the end surface of which faces the inner surface of the upper half 13A leaving a space between the inner surface. In other words, one of two opposing sides of the supporting part 28 is shorter than the other and thus a chamber 28b opened to the front of the cassette is formed between the inner surface of the upper half 13A and the supporting part 28. The chamber extends generally at an angle of $\theta_2$ with respect to the inner surface of the upper half 13A. The angle $\theta_2$ is so designed as to be smaller than the center angle $\theta_1$. Therefore, the lid locking member 26 is secured at the fixed part 26c by the supporting part 28 where it is preloaded toward the inner surface of the upper half 13A due to the above angle relationship, when the fixed part 26c is inserted into the corresponding support part 28 of the upper half 13A. As will be apparent from the above description, the mutual action due to the column 30 and the angle relationship between the fixed part 26c and the chamber 28b makes it possible not only to straighten the possible molding warp of the lid locking member 26 but also to prevent occurrence of deformation thereof due to prolonged and repeated use. The supporting part 28 can hold the lid locking member 26 securely with stability in the long term use, because the fixed part 26c of the lid locking member 26 is fitted into the supporting part 28 in such a state that the supporting part 28 tightly enclose the peripheral surface of the fixed part 26c. The vertical movement of the lid locking member 26 along the inner surface thereof is prevented by the lower half 13B which makes contact with the rear part of the lid locking member 26, as shown in FIG. 9.

In order to facilitate the insertion of the lid locking member 26 into the support part 28, there is provided a sloping surface 26e at a lower end of the fixed part 26c of the lid locking member 26, as shown in FIG. 8. Similarly, there is provided a sloping surface 28a at an upper edge of the end surface of the supporting part 28. As mentioned above, the sloping surfaces 26e and 28a can facilitate the insertion of the lid locking member 26, especially by means of an automatic assembly machine.

Figure 10:
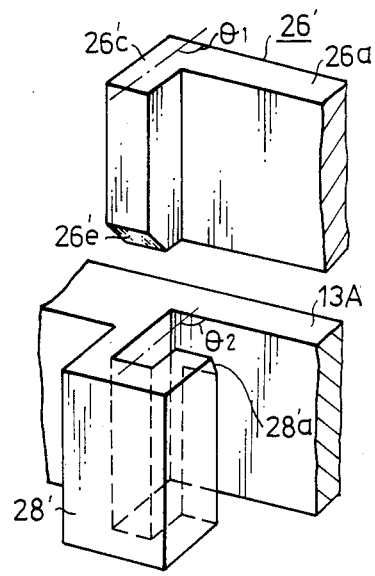
FIGS. 10 and 11 are disassembled and assembled perspective views respectively of a variation of the lid locking members.
Figure 11:
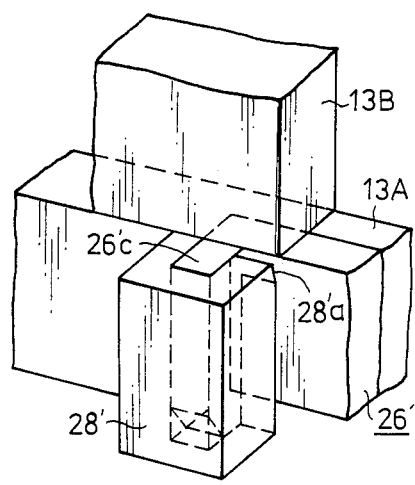
Figure 12:
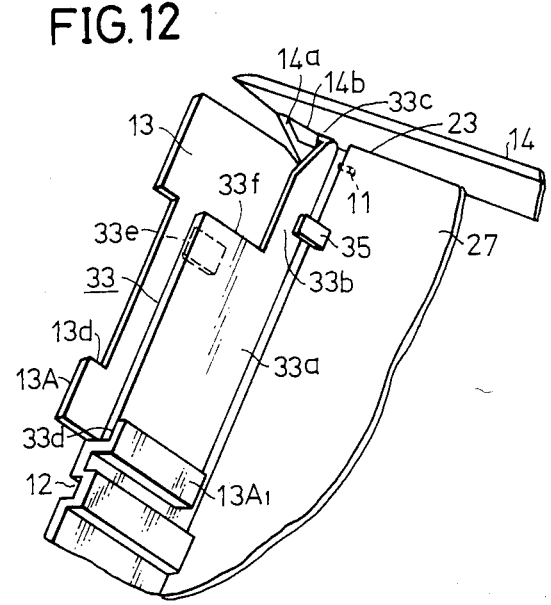
FIG. 12 is another example of a lid locking mechanism for a miniature type tape cassette according to the present invention, viewed from a take-up reel in a cassette case thereof.

A variation of the lid locking member 26 is shown in FIGS. 10, and 11. This variation has a fixed part 26c' formed at the rear part of the lid locking member 26. The fixed part 26c' is a substantially rectangular projection. respondingly, there is provided a supporting part 28' on the inner surface of the upper half 13A. The inner chamber of the supporting part 28' is formed so as to tightly enclose the fixed part 26c' of the lid locking member 26. The center angle $\theta_1$ of the fixed part 26e' with respect to the inner surface of the lid locking member 26 is designed so as to be larger than the center angle 82 of the supporting part 28' of the upper half 13A. Therefore, the lid locking member 26 whose fixed part 26c' is inserted into the corresponding supporting part 28' of the upper half 13A is supported in a state where it is preloaded toward the inner surface 25 of the upper half 13A.

When the miniature type tape cassette aforementioned is recorded and/or reproduced by the standard type recording and/or reproducing apparatus primarily designed for the standard type tape cassette, it is loaded into an accommodation area in the tape cassette adapter. At this time, the projecting part 26d of the lid locking member 26 is pressed by an inner wall built into the adapter, and the lid locking member 26 is elastically bent so as to rotate in the direction of an arrow P in FIG. 2. Correspondingly, the engagement between the hook 14b of the lid 14 and the hook 26b of the lid locking member 26 is released. As a result, an engaging member (not shown) built into the adapter, which is inserted into space between the lid 14 and the front end of the upper half 13A, forcibly opens the lid 14 in the direction R in FIG. 2 against the force applied by the torsion coil spring 23.

Also, when accommodating the miniature type tape cassette according to the present invention in the recording and/or reproducing apparatus designed exclusively for the miniature type cassette, the projecting part 26d of the lid locking member 26 is pressed by the inner wall (not shown) of the tape cassette holder in the apparatus under the same conditions as described above, and therefore the engagement between the hook 14b of the lid 14 and the hook 26b of the lid locking member 26 is released. Then, the lid 14 is rotated around the hinge pin 11 due to the action of the engaging part (not shown) built into the apparatus against the force provided by the torsion coil spring 23, and is thus opened. More detailed description with respect to the lock releasing operation will be given later.

Description will now be given of a second embodiment of a miniature type tape cassette according to the present invention in conjunction with FIGS. 12 through 15. In these figures, the same elements as those in the previous figures are indicated by the same respective reference numbers.

Essential features of the second embodiment with respect to the first embodiment discussed in the foregoing mainly exist in a stopper for preventing the lid locking member from possible damaging the magnetic tape and guide rollers built into the cassette case, keeping of play or providing idling space between the hook of the lid locking member and the hook of the lid, and the configuration of the lid locking member.

A miniature type tape cassette 32 illustrated in those figures includes the same configuration as the lid urging mechanism using the torsion coil spring 23 shown in FIGS. 5(A) and 5(B). In other words, the mechanism made up of the sliding rod 18, the U-shaped leaf spring 18 and the recess 19 shown in FIG. 1 have been replaced with removed and instead the torsion coil spring 23 as the same manner as in the first embodiment. Hence, the lid 14 is always urged toward the lid closing direction due to the action of the torsion coil spring 23.

In relation to the inner surface 25 having the cutout part 13d of the upper half 13A, there is provided a lid locking member 33 in the form of a plate, which may be formed of plastic resin or the like. The lid locking member 33 mainly has a body part 33a, a displacement part 33b, a hook 33c, a rear part 33d and a projecting part 33e. The body part 33a is considerably wide, and can elastically be deflected. The displacement part 33b integrally extends from the body part 33a over a step part 33f at which the width of the displacement part 33b is abruptly made narrower than that of the body part 33a in order to enhance elasticity thereof. In addition, the the displacement part 33b is formed so as to become smaller toward the hook 33c provided at the extreme end thereof. The hook 33c. is intended to engage with the corresponding hook 14b of the lid 14. The projecting part 33e of the lid locking member 33 is integrally formed on an outer surface of the body part 33a thereof and projects outwards from the outer surface. The projecting part 33e penetrates the through window 29 formed on the side wall of the upper half 13A and projects therefrom, when the lid locking member 33 is mounted at the predetermined position. In detail, as shown in FIGS. 15(A) and 15(B), the projecting part 33e of the lid locking member 33 is designed so as to outwards project from the side wall of the upper half 13A by a projection length $l_2$ which is designed to be longer than a distance (space) $l_3$ between the side wall of the cassette case 13 and an inner wall 34 in the adapter or the recording and/or reproducing apparatus designed exclusively for the miniature type tape cassette. Moreover, the projecting part 33e is the shape of a truncated rectangular pyramid, which is also employed in the first embodiment described in the foregoing. The rear part 33d, which has the same width as that of the body 33a, is fitted into a supporting part $13A_1$ of the upper half 13A which is of a substantially L-shaped configuration and which is located in the vicinity of the groove 12 for preventing the erroneous inserting operation of the tape cassette 32 with respect to the apparatus or the adapter. It is therefore possible to easily perform the assembly work of the lid locking member 33. In addition, undesirable vertical movement of the lid locking member 33 along the side wall is prevented, because the rear part 33d of the lid locking member 33 makes contact with the end surface of the lower half 13B.

Preferably, the hook 33c of the lid locking member 33 is located with a predetermined play or idling space $l_1$ with respect to the hook 14b of the lid 14 fully closed, as shown in FIG. 15(A). This play allows the lid 14 to be slightly rotatable even under the lid locking member 33 at the interlocking position. That rotatable amount under the interlocked state is preferably set to the opening angle of approximately 15°, for example. At the moment of the miniature type tape cassette 32 being loaded into the adapter, the lid 14 engages an engaging part of the adapter to open the lid 14, and $l_1$, or 15° of the play makes the cassette loading manipulation a lot easier because of the limited but free movement of the lid 14. The same is true for the apparatus when the miniature tape cassette is held within the holder of the apparatus exclusive for the cassette, and lowered into the apparatus while the lid 14 is opened in the similar manner mechanically instead of the manipulation.

A stopper 35 which is unitarily formed on the upper plate 27 of the upper half 13A and which projects away therefrom, is provided so as to define the deflection range of the body part 33a of the locking member 33, as shown in FIGS. 12 and 15(A) through 15(D). Therefore, it is possible to protect the magnetic tape or guide roller within the tape cassette from being disturbed, because the lid locking member 33 can move only within the limited range.

Description will now be given of detailed operation of the lid locking member 33 in conjunction with FIGS. 15(A) through 15(D).

When loading the miniature type tape cassette 32 of the second embodiment into the recording and/or reproducing apparatus exclusively designed for the miniature type tape cassette, the tape cassette 32 is inserted, in the horizontal state (laid flat), into the cassette holder of the apparatus in the direction of the arrow Q, as shown in FIG. 15(A). Then, the projecting part 33e for releasing the lid locked state makes contact with the inner wall 34 of the cassette holder of the apparatus, as shown in FIG. 15(B). The projecting part 33e is then depressed by the distance $(l_2-l_3)$ in the direction of the arrow P, and thereby the body part 33a and the displacement part 33b are elastically deflected. Thus, the hook 14b of the lid 14 and the hook 33c of the lid locking member 33 are disengaged and the interlock for the lid 14 is thereby released. The lid opening mechanism (not shown) of the recording and/or reproducing apparatus designed exclusively for the miniature type tape cassette rotates the lid 14 around the hinge pin 11 against the force due to the torsion coil spring 23. As a result, the lid 14 becomes ready to open as shown in FIG. 15(D).

Figure 13:
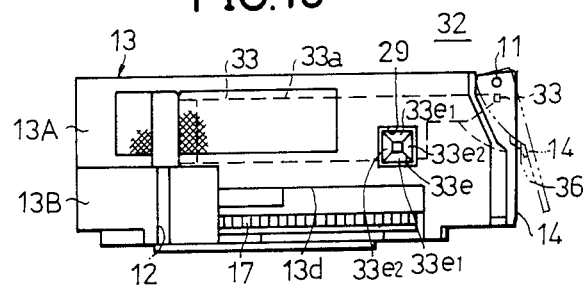
FIG. 13 is a side view of the miniature type tape cassette having a lid locking mechanism shown in FIG. 12, in a state where a lid is slightly open by a predetermined opening angle.
Figure 14:
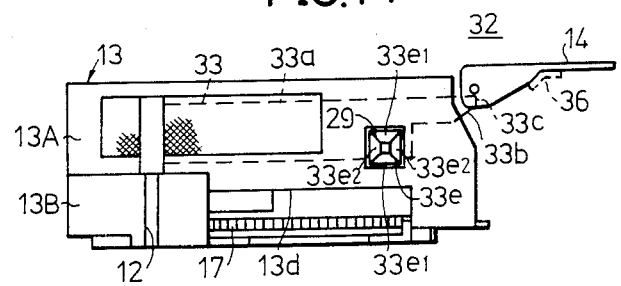
FIG. 14 is a side view of the miniature type tape cassette with the built-in lid locking mechanism shown in FIG. 12, in a state where the lid is in an open state.
Figure 15:
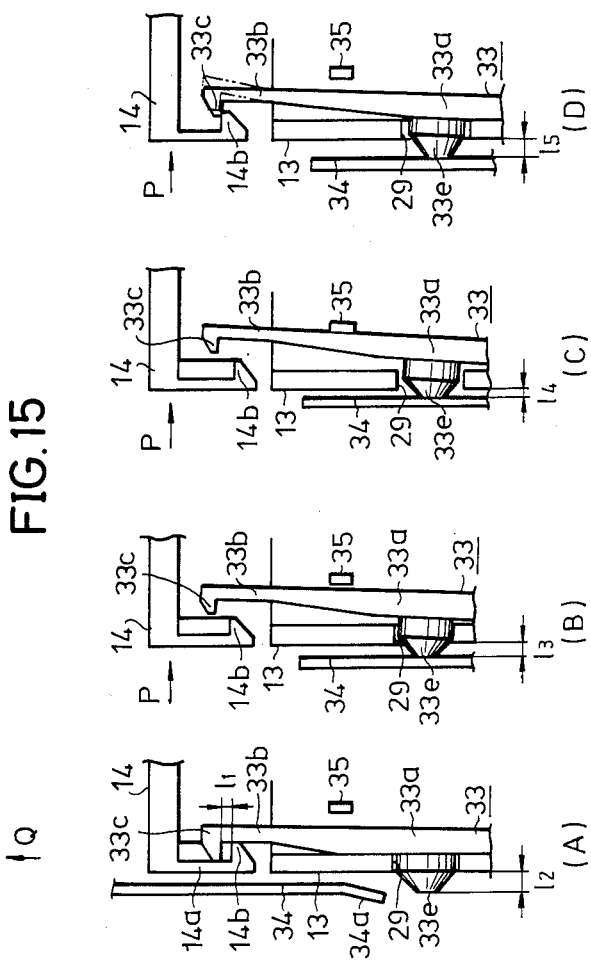
FIGS. 15(A) through 15(D) are plan views showing operating states of a lid locking member used in the lid locking mechanism shown in FIG. 12, and FIGS. 16 and 17 are respectively perspective views of variations of the lid locking member.

In this loading operation of the tape cassette, the inner wall 34 of the cassette holder makes contact with and pushes the projecting part 33e of the lid locking member 33 along its sloping surfaces $33e_1$ and $33e_2$ shown in FIGS. 13 and 14. Therefore, the cassette loading operation can smoothly be carried out without colliding with an end 34a (shown in FIG. 15(A)) of the holder 34.

Furthermore, as shown in FIG. 15(C), in a case where the distance $l_4$ between the side surface of the cassette case 13 and the inner wall 34 of the holder is shorter than the appropriate nominal distance $l_3$, due to possible production deviation introduced upon molding of cassette case or other reasons, the lid locking member 33 may be deflected excessively but is restricted by the stopper 35. It is thus possible to protect the guide roller and the magnetic tape from damage.

On the contrary, as shown in FIG. 15(D), when the distance between the side surface of the cassette case 13 and the inner wall 34 of the holder is $l_5$ which is larger than the nominal distance $l_3$, the engagement between the hooks 14b and 33c may be still maintained hooked. If this is a case, the lid 14 would be forced to open by the lid opening mechanism built into the recording and/or reproducing apparatus, because of the extra flexibility of the displacement part 33b, the hook 33c easily escapes from the undesirable engagement to unhook as shown by a two-dot chain line in FIG. 15(D), thus the problem is prevented.

The present invention has been described in detail on the basis of the two embodiments. Of course, it is possible to apply, to the first embodiment, the essential features of the second embodiment such as the play distance between the hook 14b of the lid 14 and the hook 33c of the lid locking member 33 as well as the stopper 35 for protecting the guide roller and the magnetic tape in the tape cassette. It is also possible to apply the features in the first embodiment to the second embodiment.

Figure 16:
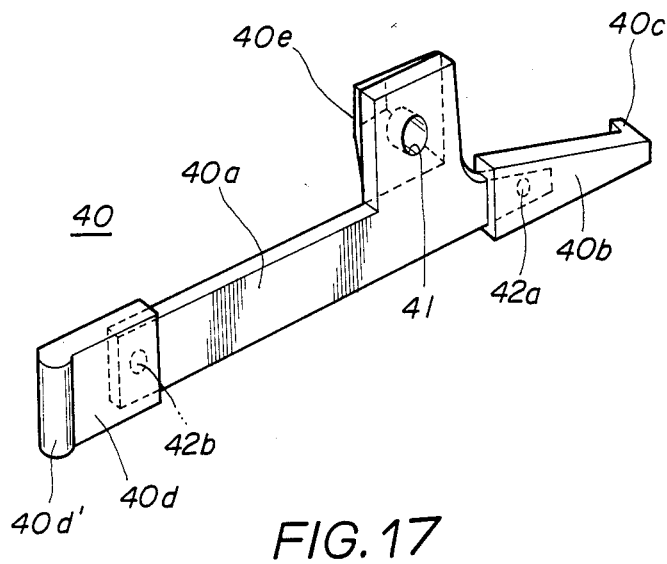

Description will now be given of variations of the lid locking member 26 or 33 described in the foregoing with reference with FIGS. 16 and 17.

A lid locking member 40 mainly has a body part 40a, a front part 40b, a hook 40c, a rear part 40d and a projecting part 40e. The body part 40a is formed with a metallic plate made of phosphor bronze or stainless steel, for providing an extra reliability. At the both ends of the body part 40a, there are molded the front part 40b and the rear part 40d which are made of plastic resin. Since there are formed through holes 42a and 42b at the front and rear parts 40b and 40d, respectively, plastic resin is poured into the through holes 40b and 40d upon molding the front and rear parts 40b and 40d. Therefore, the front and rear parts 40b and 40d are securely fastened to the body part 40a. In addition, the productivity of the lid locking member 40 is not degraded, because no rivets or like for fastening the front and rear parts 40b and 40d to the body part 40a are needed. At the extreme end of the front part 40b, there is integrally formed the hook 40c. Also, at the extreme end of the rear part 40d, there is integrally formed a fixed part 40d' which is inserted into the supporting part 28 shown in FIG. 2, for example. Further, the body part 40a has the projecting part 40e which is formed by plastic resin. The projecting part 40e is fixed to the surface of the body part 40a in such a manner that a back part of the projecting part 40e is fitted into a hole 41 which is formed in the body part 40a. The projecting part 40e is the shape of a truncate rectangular pyramid.

The lid locking member 40 can provide extremely accurate and stable engagement action between the hook 40c thereof and the hook of the lid 12b, compared with the lid locking member 26 or 33 aforementioned. This is, the body part 26a made of plastic resin is liable to be deformed under the environment of high temperature and moisture. Therefore, there is a possibility that the hook 26c of the lid locking member 26 cannot return to the original engaging state even after the depressing action against the projecting part 26e of the lid locking member 26 is removed. On the other hand, according to the lid locking member 40, the above problem can be eliminated, since the body part 40a of the lid locking member 40 is formed with the metallic plate such as phosphor bronze or stainless steel which are not subject to high temperature or moisture.

Figure 17:
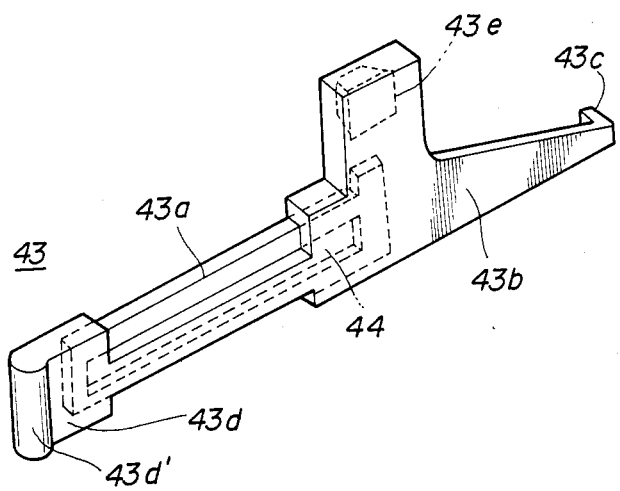

FIG. 17 illustrates another variation of the lid locking member. A lid locking member 43 illustrated has a body part 43a, a front part 43b, a hook 43c, a rear part 43d having a fixed part 43d' and a projecting part 43e. The body part 43a includes a metallic plate made of phosphor bronze or stainless steel, which has a longitudinal hole 44 which is formed in the axis direction of the lid locking member 43. The front and rear parts 43b and 43d are formed at the extreme ends of the body part 43a in such a manner that plastic resin is poured into a die in which the metal plate is placed. In this case, the front part 43b is connected to the rear part 43d by means of plastic resin which flows along the metallic plate of the body part 43a filling the longitudinal hole 44, as shown in FIG. 17. This means that it is possible to form a resin pouring inlet at one of the side portions of the die relative to the front part 43b and the rear part 43d. Of course, the lid locking member 43 has the same advantage as that illustrated in FIG. 16.

Further, the present invention is not limited to the embodiments, but various variation and modifications may be made without departing from the scope of the present invention.

What is claimed is:

1. A miniature type tape cassette comprising:
  a cassette case having an upper half and a lower half, said cassette case having a cutout part formed on a side wall thereof;
  a supply reel hub and a take-up reel hub provided side by side within said cassette case, said take-up reel hub being exposed through said cutout part;
  a lid for protecting a predetermined length of a tape path extending along the front of said cassette case, said lid being supported so as to be freely rotatable to open and close, said lid including a first hook formed on a side flange thereof;
  a spring means for urging said lid in a lid closed position; and
  a lid locking member having a projecting part, a second hook and a rear part, said projecting part passing through a through window formed at said side wall of said upper half and projecting therefrom, said second hook being located at an end of said lid locking member so as to engage with said first hook of said lid when said lid is in a closed position, said rear part being located at a position which is away from said lid and which is in the vicinity of said cutout part of said cassette case, and said rear part having a fixed part which is fitted into a supporting part formed on said side wall of said upper half so as to be affixed to said side wall,
  said fixed part at the rear end of said lid locking member being a projection, and said supporting part projecting from said side wall so as to tightly receive said projection of said fixed part, said supporting part defining a chamber extending in a generally crossing relation with said side wall.

2. A miniature type tape cassette as claimed in claim 1, wherein the projecting direction of said fixed part is slightly different from an extending direction of said chamber so as to generate a preloading effect when said fixed part is received in said chamber.

3. A miniature type tape cassette as claimed in claim 2, wherein the angle of the projecting direction of said fixed part with respect to a surface of said lid locking member is larger than that of the extending direction of said supporting part with respect to said side wall of said upper half.

4. A miniature type tape cassette as claimed in claim 1, wherein said projection of said fixed part of said lid locking member and said supporting part of said upper half respectively have slant surfaces at opposing edges thereof.

5. A miniature type tape cassette as claimed in claim 1, wherein there is provided a predetermined distance of play between said first and second hooks.

6. A miniature type tape cassette as claimed in claim 1, wherein said projecting part of said lid locking member is formed as a truncated rectangular pyramid.

7. A miniature type tape cassette as claimed in claim 1, wherein said upper half of said tape cassette includes a stopper for limiting a deflection of said lid locking member within a predetermined range.

8. A miniature type tape cassette as claimed in claim 1, wherein said lid locking member is made of elastic material.

9. A miniature type tape cassette as claimed in claim 8, wherein said second hook and said rear part of said lid locking member are formed with plastic resin and are connected each other substantially by a metallic plate.

10. A miniature type cassette as claimed in claim 8, wherein said lid locking member is made entirely of plastic resin.

11. A miniature type tape cassette comprising:
  a cassette case having an upper half and a lower half, said cassette case having a cutout part formed on a side wall thereof;
  s supply reel hub and a take-up reel hub provided side by side within said cassette case, said take-up reel hub being exposed through said cutout part;
  a lid for protecting a predetermined length of a tape path extending along the front of said cassette case, said lid being supported so as to be freely rotatable to open and close, said lid including a first hook formed on a side flange thereof;
  a spring means for urging said lid in a lid closed position; and
  a lid locking member having a projecting part, a second hook and a rear part, said projecting part passing through a through window formed at said wall of upper half and projecting therefrom, said second hook being located at an end of said lid locking member so as to engage with said first hook of said lid when said lid is in a closed position, said rear part being located at a position which is away from said lid and which is in the vicinity of said cutout part of said cassette case, and said rear part having a fixed part which is fitted into a supporting part formed on said side wall of said upper half so as to be affixed to said side wall,
  said upper half having a column formed at an upper plate, so that said lid locking member is held against said side wall of said upper half.

* * * * *